United States Patent
Fromm et al.

(10) Patent No.: US 6,684,689 B2
(45) Date of Patent: Feb. 3, 2004

(54) METHOD FOR DIAGNOSING THE ADJUSTMENT DEVICE OF A SWIRL CONTROL VALVE

(75) Inventors: Robert Fromm, Donaustauf (DE); Johann Graf, Hausen (DE); Michael Henn, Regensburg (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/113,163

(22) Filed: Apr. 1, 2002

(65) Prior Publication Data
US 2002/0129646 A1 Sep. 19, 2002

Related U.S. Application Data

(63) Continuation of application No. PCT/DE01/02682, filed on Jul. 18, 2001.

(30) Foreign Application Priority Data

Aug. 1, 2000 (DE) .......................................... 100 37 511

(51) Int. Cl.$^7$ .................................................. G01P 5/00
(52) U.S. Cl. ..................................................... 73/118.2
(58) Field of Search ........................... 73/118.2, 118.1, 73/116, 117.2, 117.3

(56) References Cited

U.S. PATENT DOCUMENTS

| 5,542,388 A | | 8/1996 | Ichinose et al. |
| 5,679,891 A | | 10/1997 | Matsuno et al. |
| 5,715,793 A | * | 2/1998 | Motose .................. 123/406.52 |
| 6,167,342 A | * | 12/2000 | Itoyama et al. ............. 701/104 |

FOREIGN PATENT DOCUMENTS

| DE | 35 02 573 C2 | 7/1986 |
| DE | 197 40 970 A1 | 10/1998 |
| DE | 198 60 323 A1 | 7/1999 |
| EP | 0 886 725 B1 | 12/1998 |
| JP | 08 074 583 A | 3/1996 |

* cited by examiner

Primary Examiner—Edward Lefkowitz
Assistant Examiner—Corey D. Mack
(74) Attorney, Agent, or Firm—Laurence A. Greenberg; Werner H. Stemer; Ralph E. Locher

(57) ABSTRACT

The activation of a swirl control valve which is seated downstream of a throttle valve in the intake tract of an internal combustion engine is diagnosed. The swirl control valve is activated by a specific adjustment travel within a supercritical operating range of the intake pipe pressure in the intake tract downstream of the throttle valve. If a specific jump in pressure that is dependent on the adjustment travel does not take place in the intake tract downstream of the throttle valve, a defect in the actuation of the swirl control valve is diagnosed.

11 Claims, 4 Drawing Sheets ian ln US 6,684,689 B2

METHOD FOR DIAGNOSING THE ADJUSTMENT DEVICE OF A SWIRL CONTROL VALVE

CROSS-REFERENCE TO RELATED APPLICATION

This application is a continuation of copending International Application No. PCT/DE01/02682, filed Jul. 18, 2001, which designated the United States.

BACKGROUND OF THE INVENTION

Field of the Invention

The invention relates to a method for diagnosing an activation of a swirl control valve, in particular for diagnosing a swirl control valve adjustment device which outputs a position signal that indicates the position of the swirl control valve.

In internal combustion engines, a so-called swirl control valve is frequently used to control the charging of a cylinder with mixture. This swirl control valve is located downstream of the air collector before the inlet valve and influences the flow-in conditions of the intake air, for example in that one of two inlet ducts of a cylinder is closed to a greater or lesser degree. As a result, it is possible to influence the swirl with which the aspirated gas passes into the cylinder. Hence the name "swirl control valve." Each cylinder has its own swirl control valve; the swirl control valves are connected by way of a coupling linkage which is actuated by an adjustment device which simultaneously outputs a position feedback signal, so that a control device has information on the current position of the swirl control valves. One reason for which this is necessary is that many of the characteristic diagrams used in modern internal combustion engines for control also take into account the position of the swirl control valve.

It is therefore necessary to check the function of the actuation of the swirl control valve, not least because it is a component which affects emissions and which is legally required to be subject to continuous checking during the operation of an internal combustion engine.

Hitherto, in order to check a swirl control valve, it has been customary to provide a second, i.e. redundant, sensor which senses the position of the swirl control valve so that correct functioning of the actuation of the swirl control valve and in particular the activity of the adjustment device and the position signal of the position feedback can be checked. See, for example, U.S. Pat. No. 6,135,085 or the corresponding German patent application DE 198 60 323 A1. Such redundancy is, however, costly, in particular because a separate sensor on each swirl control valve is needed to monitor the coupling linkage.

Japanese published patent application JP 08074583 A discloses a method for diagnosing a swirl control valve which is seated downstream of a throttle valve in the intake tract of an internal combustion engine, in which method, after the swirl control valve has been adjusted, the degree of opening of the swirl control valve is sensed directly or indirectly, for example by means of a pressure sensor downstream of the swirl control valve, the pressure signal which is obtained here is compared with a stored setpoint value and a defect in the swirl control valve is diagnosed on the basis of this comparison. This publication does not specify under which operating conditions this diagnosis is to be carried out.

SUMMARY OF THE INVENTION

It is accordingly an object of the invention to provide a method for diagnosing an activation of a swirl control valve, which overcomes the above-mentioned disadvantages of the heretofore-known devices and methods of this general type and which does away with the requirement for redundant position sensors.

With the foregoing and other objects in view there is provided, in accordance with the invention, a method of diagnosing an activation of a swirl control valve disposed downstream of a throttle valve in an intake tract of an internal combustion engine. The method comprises:

actuating the swirl control valve by a predefined adjustment travel within a supercritical operating range of an intake pipe pressure in the intake tract downstream of the throttle valve during lambda-1-controlled operation of the internal combustion engine; and if a specific step-like change in pressure dependent on the adjustment travel does not take place in the intake tract downstream of the throttle valve, diagnosing a defect in the activation of the throttle valve.

In accordance with a specific embodiment, the following steps are carried out to diagnose an adjustment device that activates the swirl control valve and outputs a position signal indicating a position of the swirl control valve:

adjusting the swirl control valve by an adjustment travel until the position signal indicates a specific limit position;

sensing the intake pipe pressure between the swirl control valve and the throttle valve before and after the adjustment;

determining a difference between the intake pipe pressure sensed before and after the adjustment; and diagnosing a defect in the adjustment device for different drops below a specific threshold value.

The invention is based on the recognition that an adjustment operation of the swirl control valve leads to a specific change in the intake pipe pressure in a quite specific operating range of the intake pipe pressure of an internal combustion engine. If the swirl control valve is adjusted by a specific adjustment travel, for example as far as a specific limit position, a specific jump in intake pipe pressure occurs. The adjustment of the swirl control valve continues to have no effect on the load of the internal combustion engine if it is in the supercritical operating range of the intake pipe pressure because the sucked-in air mass flow rate is then independent of the adjustment of the swirl control valve.

According to the invention, the adjustment of the swirl control valve therefore takes place only at supercritical intake pipe pressure. The expression "supercritical" range is a term of art known to those of skill in the art. The pressure goes supercritical when the intake pipe pressure downstream of the throttle valve is less than approximately 55% of the ambient pressure. If the pressure is in this supercritical range, adjustment of the throttle valve does not lead to a jump in the load.

If the jump in the intake pipe pressure does not occur when there is an adjustment of the swirl control valve, either the adjustment mechanism or the position feedback is faulty. The method according to the invention thus easily permits diagnosis of the actuation of the swirl control valve by means of measuring pickups which are present in any case—the intake pipe pressure is usually sensed in an internal combustion engine.

The method according to the invention has, in particular, the advantage that measuring errors which are included in both pressure measurements, i.e. in the intake pipe pressure measurement, are eliminated by the formation of differences.

The diagnostic results are particularly reliable, of course, if the jump in pressure is large. For this purpose it is possible, within the supercritical range, to delimit a particular range in which the jump in pressure is particularly large. It is also possible to use a swirl control valve adjustment travel which is as large as possible, because the jump in intake pipe pressure depends on the adjustment travel of the swirl control valve which takes place during the actuation.

In accordance with an added development of this advantageous refinement, it is possible firstly to determine the current position of the swirl control valve before a swirl control valve adjustment operation which is intended for a diagnosis and then to select the specific limit position provided for in the diagnosis adjustment in such a way that a maximum adjustment travel results from the current position.

Further improvement in the diagnosis is obtained by virtue of the fact that it is carried out repeatedly in succession. Because a quite specific swirl control valve position is generally desired for a specific operating phase of an internal combustion engine, double execution of the diagnosis can be particularly preferably achieved if, in the first instance, the adjustment from the setpoint position predefined by the control device into a specific limit position is utilized for a first diagnosis and then the adjustment back into the setpoint position is utilized for a second diagnosis. In this way, two advantages are achieved, on the one hand precisely the setpoint position desired by the control device for the swirl control valve is maintained with the exception of the time period of the diagnosis, and on the other hand two diametrically opposed swirl control valve adjustments which can be used for a diagnosis are carried out.

Of course, it is desired to let diagnoses run basically as imperceptibly as possible. For this reason, it is particularly preferred if a diagnosis utilizes signals or adjustments which occur during normal operation. For this reason, it is particularly preferred to allow the adjustment of the swirl control valve which is necessary for the diagnosis to coincide with a swirl control valve activation which is requested in any case during operation of the internal combustion engine. This permits a swirl control valve adjustment travel which is necessary in any case to be utilized for the diagnosis, the diagnosis being carried out in one advantageous development only if a specific minimum adjustment travel is reached. In one refinement of this development which uses normal operating conditions of the swirl control valve, an adjustment of the swirl control valve which is requested by the control device during normal operation of the internal combustion engine can also be utilized by suitably enlarging the adjustment travel actually requested, in such a way that a specific suitable minimum adjustment travel is reached if the adjustment travel which is actually requested by the control device is not sufficient for reliable diagnosis. In this development, the swirl control valve is therefore adjusted beyond a limit position requested during normal operation until the minimum adjustment travel necessary for the diagnosis is reached.

Alternatively, a minimum adjustment travel which is necessary for the diagnosis can also be ensured by triggering the diagnosis only if the swirl control valve is located within a specific range near to its minimum or maximum degree of opening. This can be detected, for example, from the position signal. If the swirl control valve is then actuated away from this minimum or maximum degree of opening in the direction of the opposite limit position, a maximum adjustment travel, and thus a maximum jump in pressure in the intake pipe, are obtained.

Other features and modes of the method that are considered as characteristic for the invention are set forth in the appended claims.

Although the invention is illustrated and described herein as embodied in a method for diagnosing the adjustment device of a swirl control valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
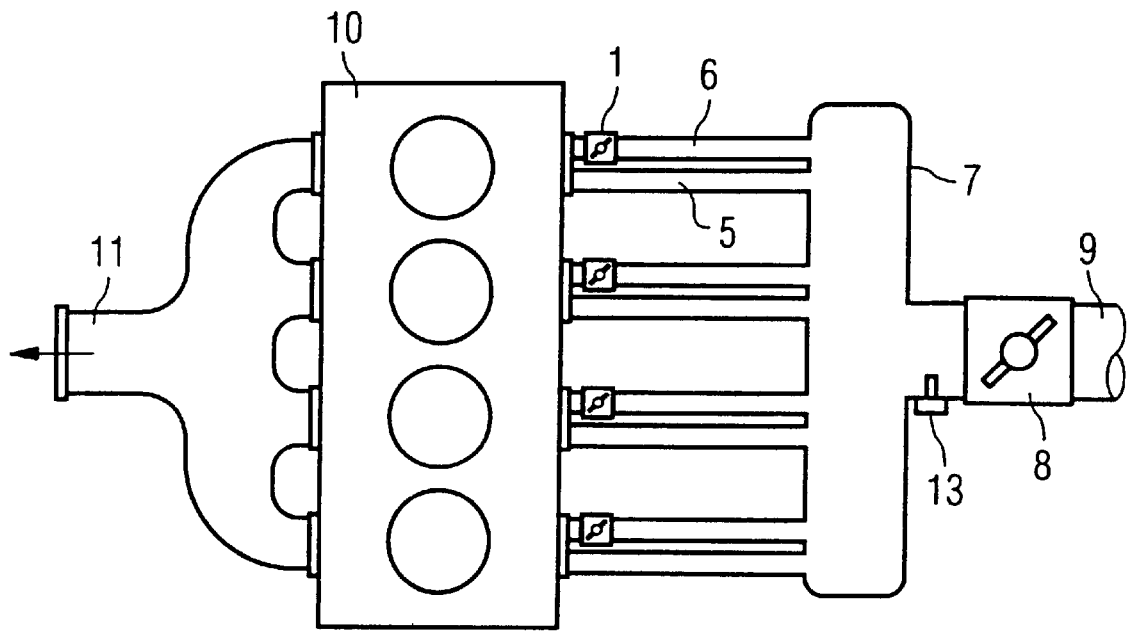
FIG. 1 is a schematic of a four-cylinder internal combustion engine with swirl control valves for each cylinder.

Referring now to the figures of the drawing in detail and first, particularly, to FIG. 1 thereof, there is shown a schematic view of a spark-ignition internal combustion engine 10 with four cylinders. It will be understood that the invention applies equally to engines with any number of cylinders so that the number of cylinders is not significant. The internal combustion engine 10 has an exhaust manifold 11 which receives the exhaust gases from the cylinders, and an intake pipe 9, on the intake tract side of the engine through which it aspirates in the air necessary for the combustion. Downstream of the intake pipe 9, seen in the intake flow direction, there is a throttle valve 8, by means of which the load is controlled during a lambda-1-controlled operation of the internal combustion engine. Downstream of the throttle valve 8 there is the air collector 7, or intake manifold 7, which is divided into two partial intake ducts 5, 6 for each cylinder and in which an intake pipe pressure pickup 13 senses the absolute pressure.

Figure 2:
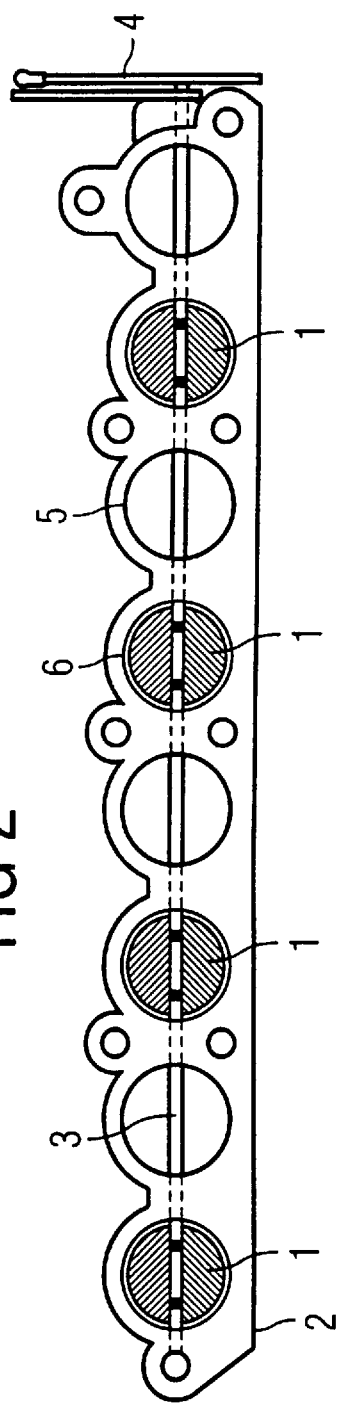
FIG. 2 is an elevational view of an inlet module that is disposed directly before the inlet valves of the internal combustion engine in FIG. 1 and that has the swirl control valves.

The partial intake ducts 5 and 6 lead into the ducts to the inlet valves via a flange part which is illustrated in FIG. 2. Here, a swirl control valve 1 is located in each partial intake duct 6.

This swirl control valve 1 which is seated in the flange part 2 can close off the respective partial intake duct 6 as desired. The swirl control valves 1 are, for this purpose, seated on a coupling linkage which is embodied as a shaft 3 and which is driven by an actuator drive 4. A rotation of the shaft 3 rotates the swirl control valves 1 and thus releases the partial intake ducts 6 to a greater or lesser extent. The actuator drive 4 has a non-illustrated position feedback and passes on the corresponding position signal to a control device which actuates it and which is likewise not shown for the sake of better clarity.

Figure 3:
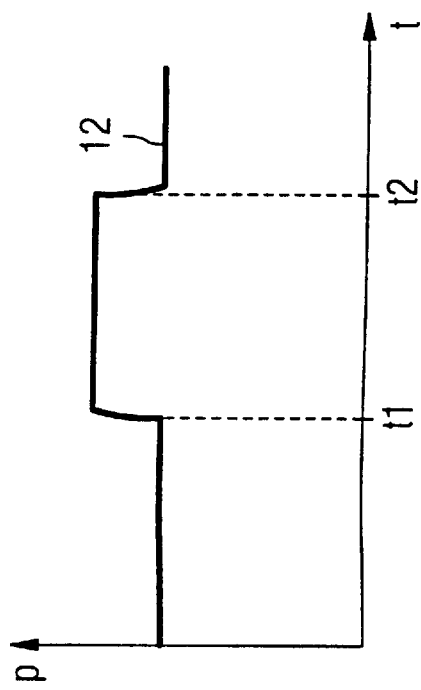
FIG. 3 is a graph of a time sequence of the intake pipe pressure during a diagnostic process.

The position signal which is output by the actuator drive 4 and the activity of the actuator drive 4, the coupling linkage and thus the actuation of the swirl control valve can then be monitored in their entirety by actuating the actuator drive and thus the swirl control valves 1. This is illustrated in FIG. 3 at the time $t_1$. The actuator drive 4 is actuated as long as a certain minimum adjustment travel of the swirl control valves has been reached. As a result, a pressure p rises in the intake pipe, which is apparent in the curve in FIG. 3 as a jump in pressure. The level of this jump in pressure depends on the adjustment travel. This permits diagnosis of the actuator drive 4. If the corresponding jump in pressure does not occur with the adjustment travel shown by the position feedback, either the actuator drive or the coupling linkage or the position feedback is defective.

In order to keep the load of the internal combustion engine 10 free from influence by this actuation of the swirl control valve, the actuation takes place in the supercritical range of the intake pipe pressure, i.e. when the intake pipe pressure is less than 55% of the ambient pressure.

So that, after the adjustment of the throttle valves 1 which is brought about for the diagnosis, it is possible to return to the original throttle valve position which is desired instantaneously, for example, for the operation of the internal combustion engine, the throttle valves 1 can be reset with the actuator drive 4 at a later time. This takes place in FIG. 3 at the time $t_2$. A corresponding jump of the intake pipe pressure p back to the original value, as shown in curve 12, then takes place.

Figure 4:
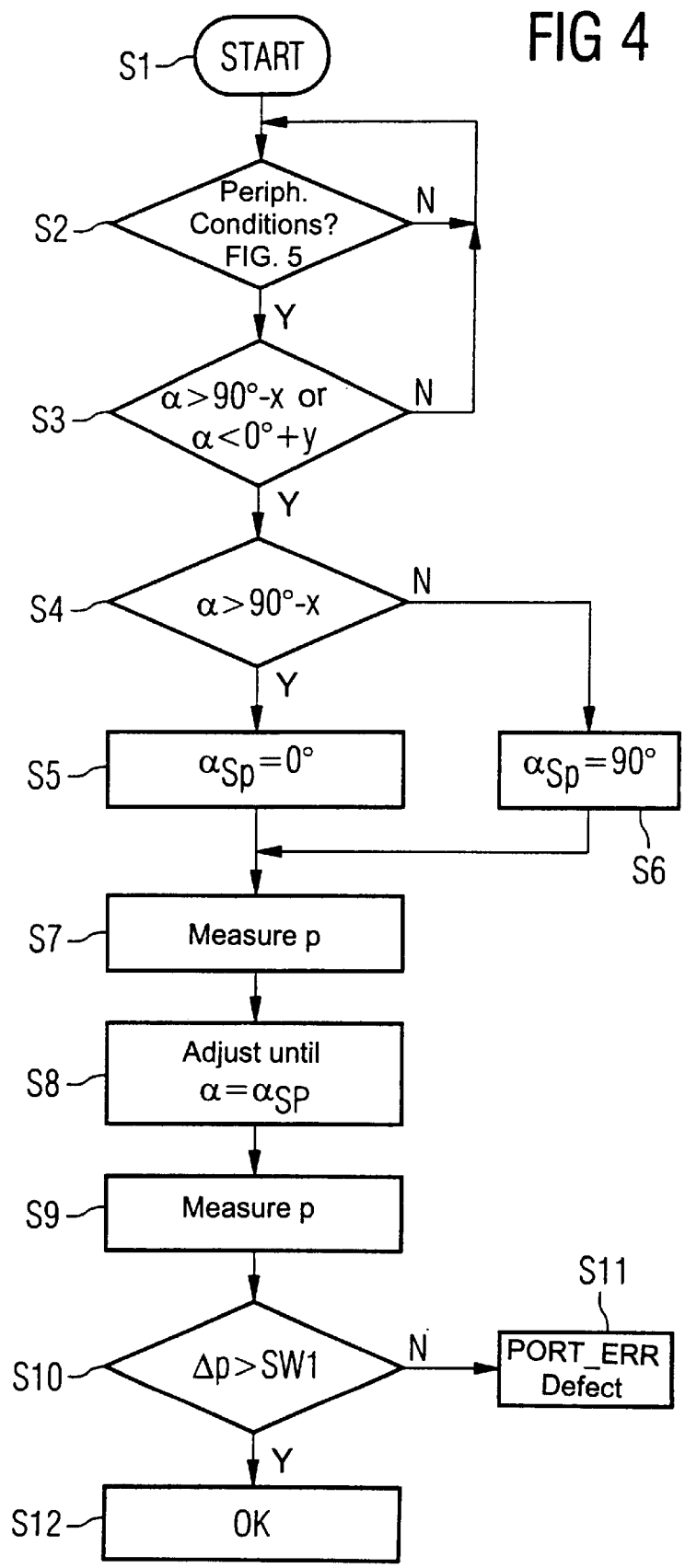
Figure 6:
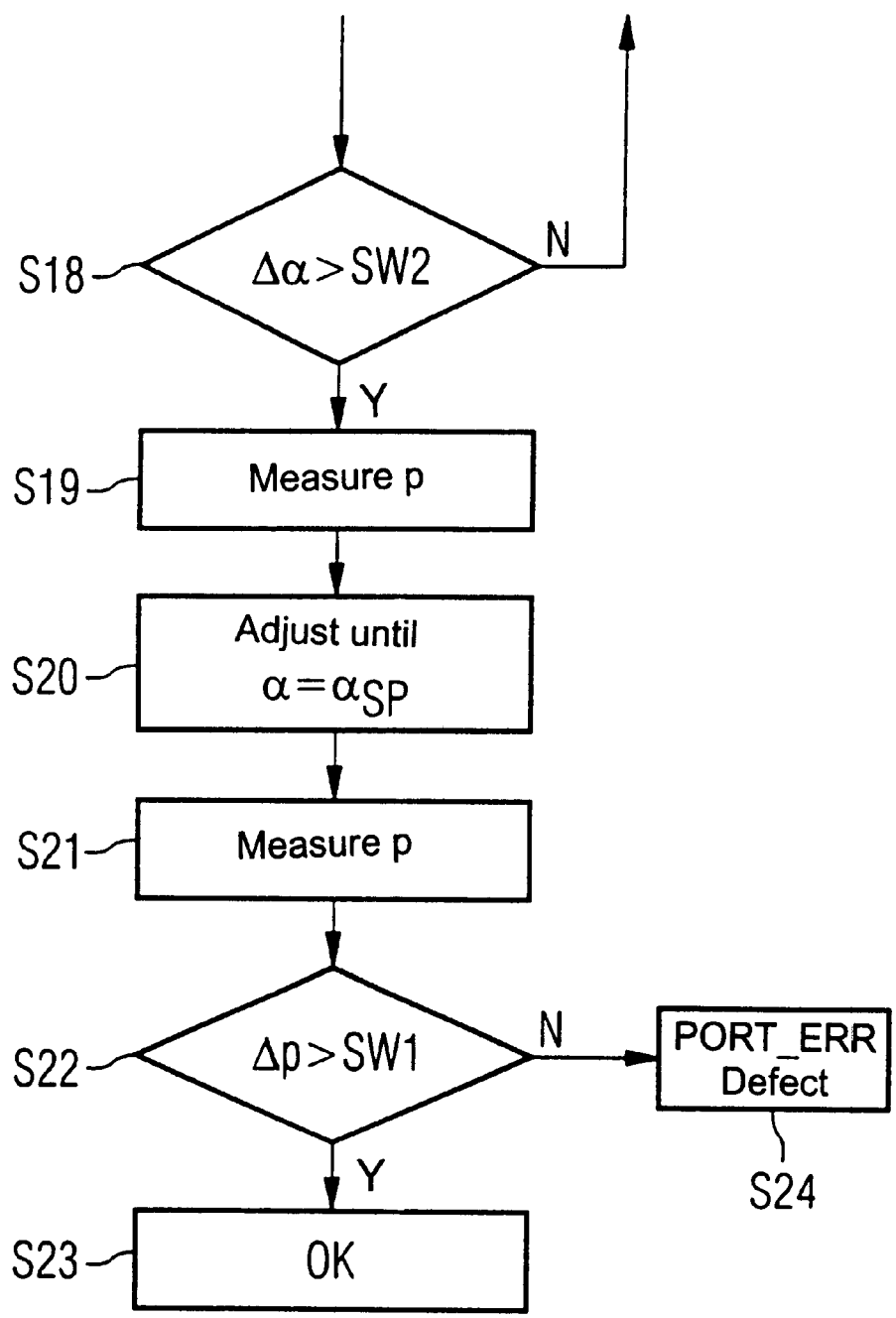

In one embodiment, the diagnostic method runs in detail as shown in FIG. 4, the reference symbols which begin with an S designating corresponding steps of the method.

The process is started in step S1. In step S2, the system tests whether certain peripheral conditions are fulfilled; an explanation of how this takes place will be given later in FIG. 5.

If the peripheral conditions are fulfilled (Y branch), it is tested in step S3 to determine whether the opening angle $\alpha_0$ of the throttle valves 1 lies in the region of the maximum or minimum degree of opening (x and y in step S3 designate values near to zero which designate the range or travel within which the opening angle must be with respect to the minimum or maximum degrees of opening). If this is the case (Y branch), it is tested in step S4 to determine whether the opening angle $\alpha_0$ is near to the maximum degree of opening; otherwise the system jumps back before step S2 because no adjustment travel which is sufficient for the diagnosis is possible, as the swirl control valve is in the intermediate position. If $\alpha_0$ is near to the maximum degree of opening, the minimum degree of opening, for example 0°, is selected as the setpoint value asp for the following diagnostic adjustment. If the result of step S4 was that the opening angle was near to the minimum degree of opening, the maximum degree of opening, for example 90° is selected as a setpoint value $\alpha_{sp}$ in step S6.

Then, in step S7, the intake pipe pressure p is measured. Subsequently, in step S8 the actuator drive 4 is actuated until the opening angle shown by the position feedback corresponds to the setpoint value $\alpha_{sp}$. If there is no supercritical intake pipe pressure present, the load is simultaneously kept constant by ignition intervention. Then, in step S9, the intake pipe pressure is measured again. If the result of the interrogation in step S10 is that the difference between the intake pipe pressures measured in step S7 and step S9 is less than a threshold value SW1, a defect of the actuator drive or of the position feedback assigned to it is diagnosed in step S11 and a signal marking PORT_ERR is set. Otherwise (Y branch), in step S12 the operational capability of the adjustment device is determined. The threshold value SW1 can be selected to be fixed or dependent on the adjustment travel, i.e. on the difference $|\alpha_0-\alpha_{sp}|$.

Figure 5:
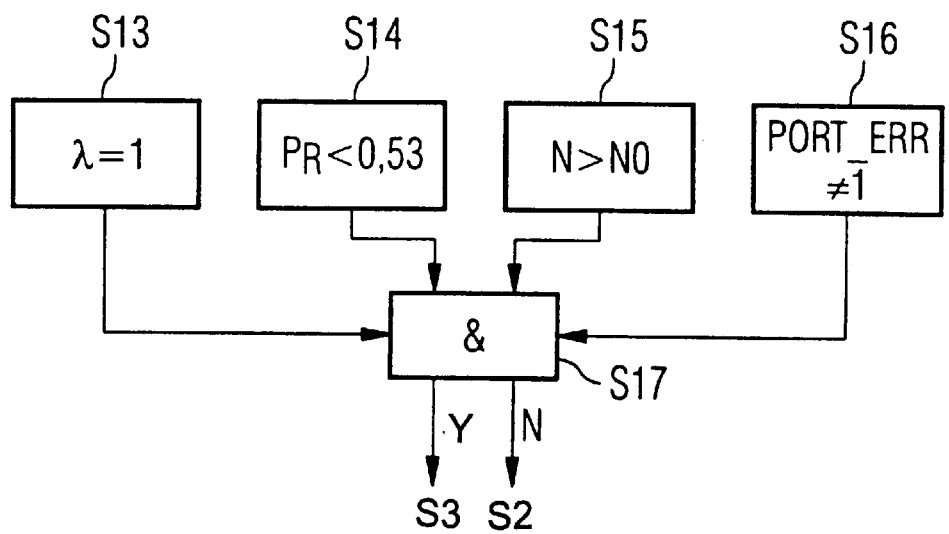
FIGS. 4, 5 and 6 are flowcharts of a diagnostic sequence.

The checking of the peripheral conditions in step S2 is shown in more detail in FIG. 5. In order to ensure that there is an operating range in which the adjustment travel of the swirl control valve can be assigned to a jump in intake pipe pressure, in step S13 it is checked whether lambda-1-controlled operation is taking place. Furthermore, in step S14 it is checked whether the pressure ratio $P_R$ composed of intake pipe pressure and ambient pressure is less than 0.53. The significant factor here is not the value 0.53, but rather the fact that the intake pipe pressure is in the supercritical range. At 0.53 this is reliably the case, but, depending on the configuration of the intake pipe and of the pressure measurements, other values, for example between 0.4 and 0.6, are also possible. Furthermore, in step S15 the system checks whether the rotational speed N of the internal combustion engine is higher than a setpoint rotational speed N0. Finally, in step S16 the system checks that no signal marking is set for a fault in the actuation of the swirl control valve, i.e. whether PORT_ERR is not equal to 1. Marking would be set if a previous diagnosis had already produced a fault.

The outputs of the steps S13 to S16 are AND-linked in step S17. If this results in a positive outcome (Y branch), i.e. if all the interrogations of the steps S13 to S16 are positive, the necessary peripheral conditions are fulfilled in step S2. Otherwise, this is not the case (N branch in step S2).

In a further embodiment of the method, an adjustment travel which occurs in any case during normal operation of the internal combustion engine as a result of requested actuation of the swirl control valve can be utilized for diagnosis. For this purpose, in a step S18 it is checked whether the requested adjustment travel or adjustment angle $\Delta\alpha$ is greater than a threshold value SW2. If this is the case, the diagnosis is continued, otherwise the system jumps back to the start of the diagnosis. The threshold value SW2 can, as with SW1, be selected to be dependent on operating parameters because, for example, the rotational speed of the internal combustion engine affects the relationship between adjustment travel and jump in pressure. If the interrogation in step S18 is positive (Y branch), the intake pipe pressure is measured in a step S19. Then, in step S20, the setpoint value $\alpha_{sp}$, which is requested in any case, for the opening angle $\alpha$ is set by the actuator drive 4 being correspondingly actuated until its position feedback signal indicates $\alpha_{sp}$. Then, in step S21, the intake pipe pressure is measured again. If the result of the interrogation in step S23 is that the jump $\Delta_p$ in pressure obtained from the difference between the pressures of the steps 19 and S21 is smaller than the threshold value SW1, in step S24 a defect is diagnosed and the signal marking PORT_ERR is set in step S16. Otherwise, in step S23 the system is recognized as being operationally capable.

We claim:

1. A method of diagnosing an activation of a swirl control valve disposed downstream of a throttle valve in an intake tract of an internal combustion engine, which comprises:
   actuating the swirl control valve by a predefined adjustment travel within a supercritical operating range of an intake pipe pressure in the intake tract downstream of the throttle valve during lambda-1-controlled operation of the internal combustion engine; and if a specific stepwise pressure change dependent on the adjustment travel does not take place in the intake tract downstream of the throttle valve, diagnosing a defect in the activation of the swirl control valve.

2. The method according to claim 1, which comprises carrying out the following steps to diagnose an adjustment device that activates the swirl control valve and outputs a position signal indicating a position of the swirl control valve:

adjusting the swirl control valve by an adjustment travel until the position signal indicates a specific limit position;

sensing the intake pipe pressure between the swirl control valve and the throttle valve before and after the adjustment;

determining a difference between the intake pipe pressures sensed before and after the adjustment; and diagnosing a defect in the adjustment device when the difference is below a specific threshold value.

3. The method according to claim 2, which comprises specifying the specific limit position such that the swirl control valve is adjusted over a maximum travel in the adjusting step.

4. The method according to claim 3, which comprises, prior to the adjusting step, determining a current position of the swirl control valve.

5. The method according to claim 1, which comprises applying the required adjustment travel to a swirl control valve adjustment operation required during the operation of the internal combustion engine.

6. The method according to claim 1, which comprises actuating the swirl control valve twice to return the swirl control valve to an initial position prior to a first activation.

7. The method according to claim 1, which comprises, in an internal combustion engine with exhaust-gas feedback, maintaining the exhaust-gas feedback rate constant.

8. The method according to claim 7, which comprises maintaining the exhaust-gas feedback rate substantially close to zero.

9. The method according to claim 7, which comprises maintaining the exhaust-gas feedback rate at zero.

10. The method according to claim 1, which comprises carrying out the method only above a specific minimum rotational speed of the internal combustion engine.

11. The method according to claim 1, which comprises carrying out the method only if the swirl control valve is located within a specific range near to a minimum or a maximum degree of opening thereof.

* * * * *